United States Patent [19]

Specktor et al.

[11] Patent Number: 5,129,669

[45] Date of Patent: Jul. 14, 1992

[54] DEVICE FOR ADJUSTMENT OF AUTOMOBILE WHEEL ALIGNMENT

[75] Inventors: Gerald A. Specktor, St. Paul; John Specktor, Golden Valley, both of Minn.

[73] Assignee: Shim-A-Line, Inc., Minneapolis, Minn.

[21] Appl. No.: 693,669

[22] Filed: Apr. 30, 1991

Related U.S. Application Data

[63] Continuation of Ser. No. 342,459, Apr. 21, 1989, Pat. No. 5,044,659.

[51] Int. Cl.⁵ ............................................. B62D 17/00
[52] U.S. Cl. .................................................. 280/661
[58] Field of Search .......................... 280/96.1, 661, 673

[56] References Cited

U.S. PATENT DOCUMENTS

| | | | |
|---|---|---|---|
| 3,880,444 | 4/1975 | Bridges | 280/96.2 |
| 4,595,216 | 6/1986 | Ware | 280/661 |
| 4,618,162 | 10/1986 | Specktor et al. | 280/661 |
| 4,706,987 | 11/1987 | Pettibone et al. | 280/661 |
| 4,718,691 | 1/1988 | Specktor et al. | 280/661 |
| 4,736,964 | 4/1988 | Specktor | 280/661 |
| 4,836,574 | 6/1989 | Ingalls | 280/661 |
| 4,838,573 | 6/1989 | Specktor et al. | 280/661 |
| 4,863,187 | 9/1989 | Artz | 280/661 |

Primary Examiner—Kenneth R. Rice
Assistant Examiner—Paul Dickson
Attorney, Agent, or Firm—Kinney & Lange

[57] ABSTRACT

A device for adjusting at least one alignment characteristic in a suspension system of an automotive vehicle that includes a wheel support member and a wheel attached to the wheel support member by at least one removable bolt, whose removal permits the alignment characteristic of the wheel to be adjusted. The device includes an adjusting bolt means having a shaft whose diameter is smaller than the diameter of the removable bolt and a mechanism for engaging the adjusting bolt such that the adjusting bolt is axially offset in the bore from which the removable bolt was removed and a mechanism for acting against the wheel assembly due to the offset axial position of the adjusting bolt for movement of the wheel assembly relative to the wheel support and means for securing the bolt in a non-rotatable position once the adjustment of the alignment characteristic has been completed.

2 Claims, 5 Drawing Sheets

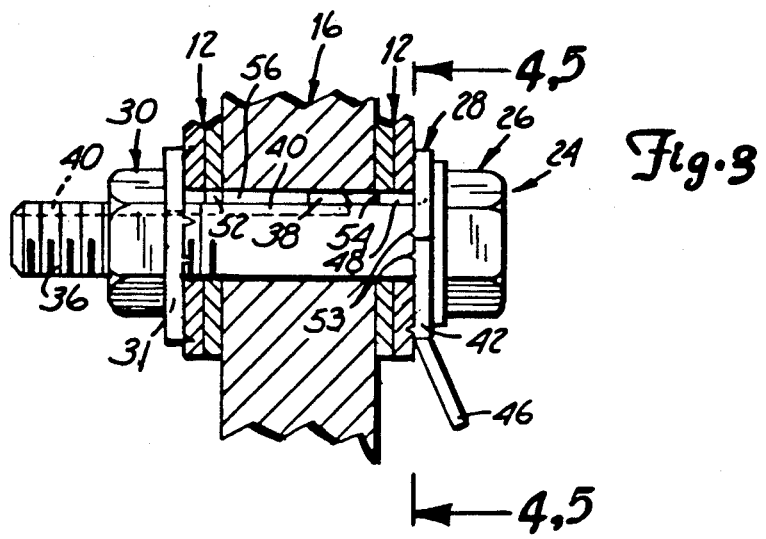
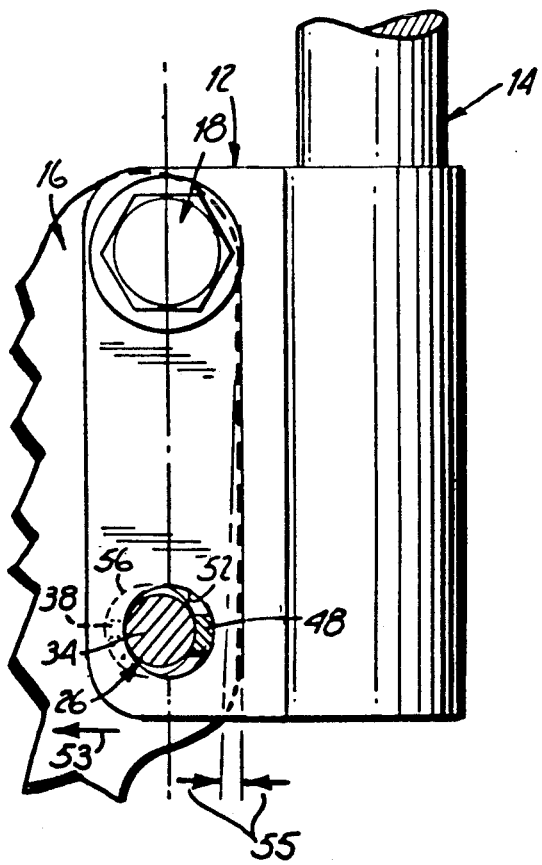
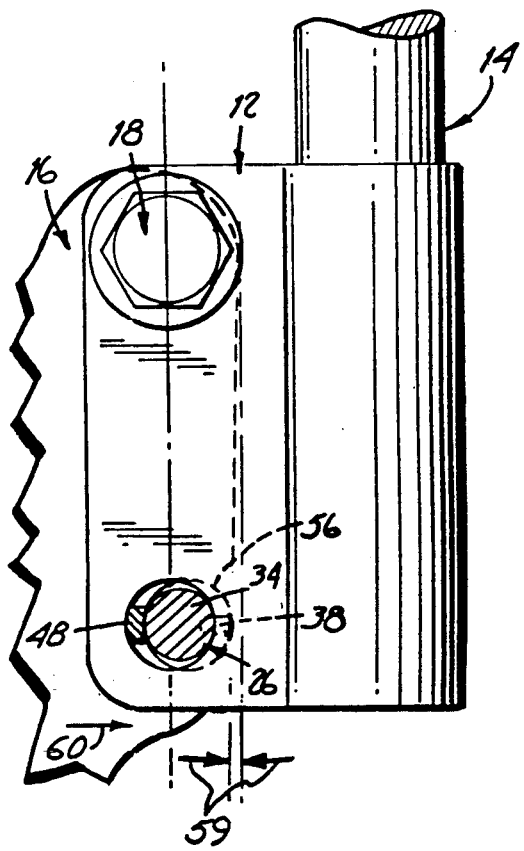

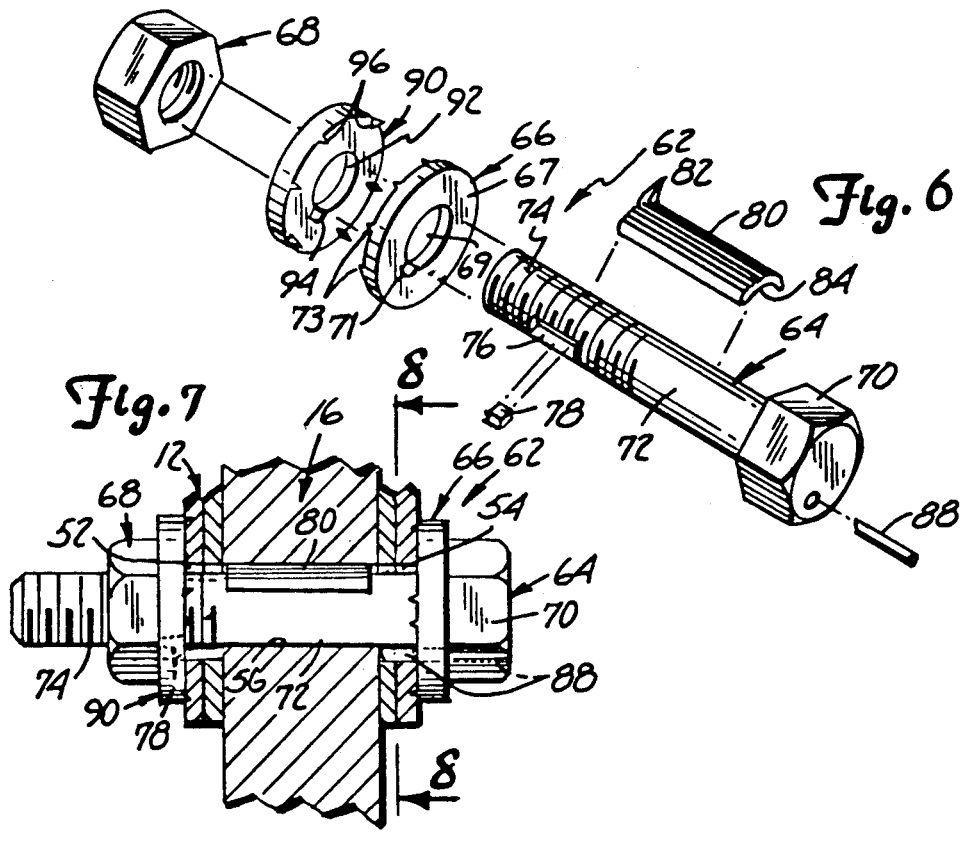
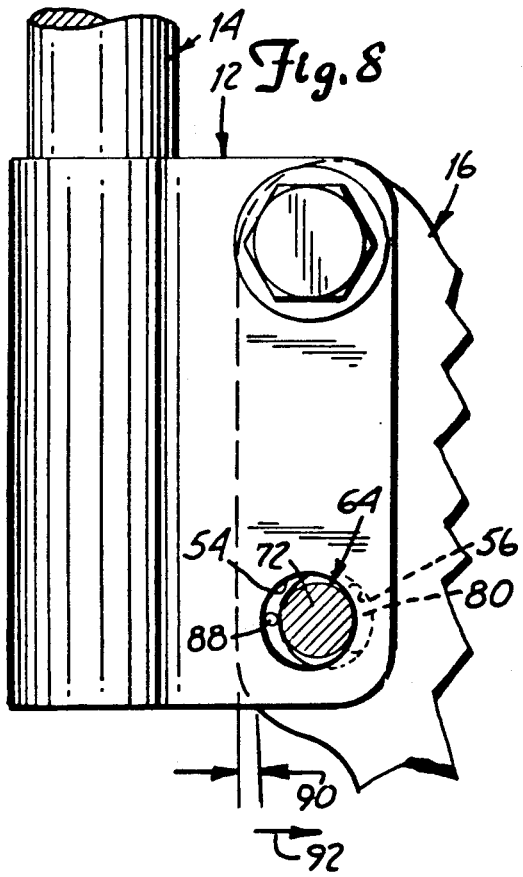

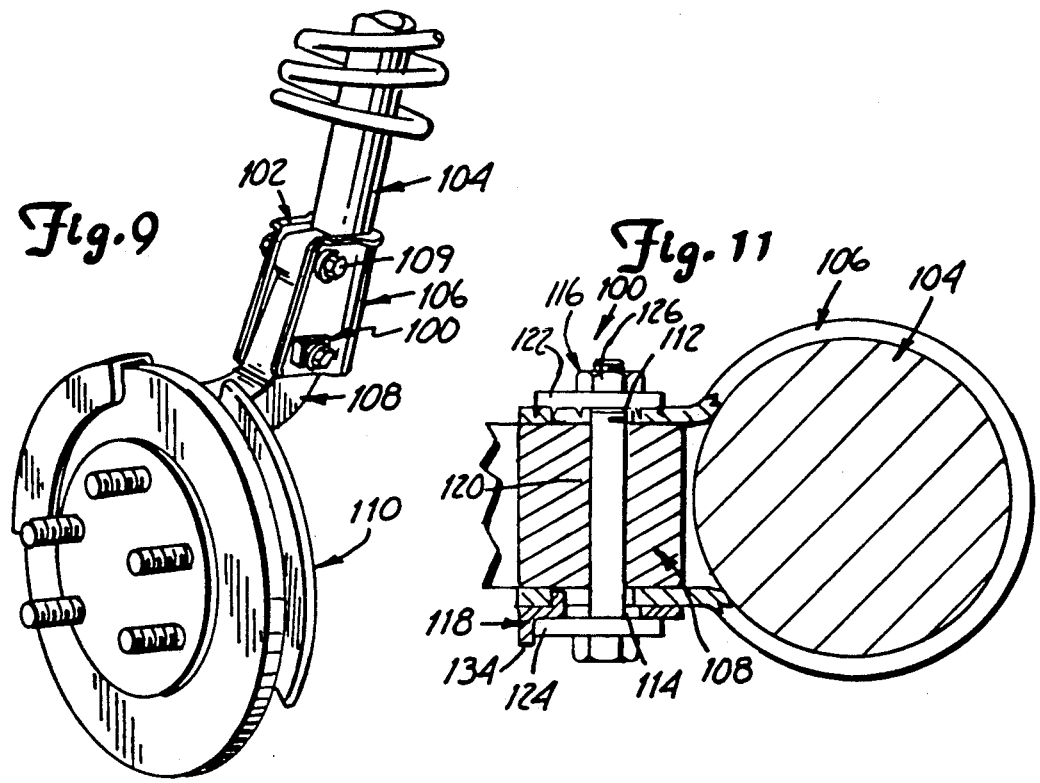
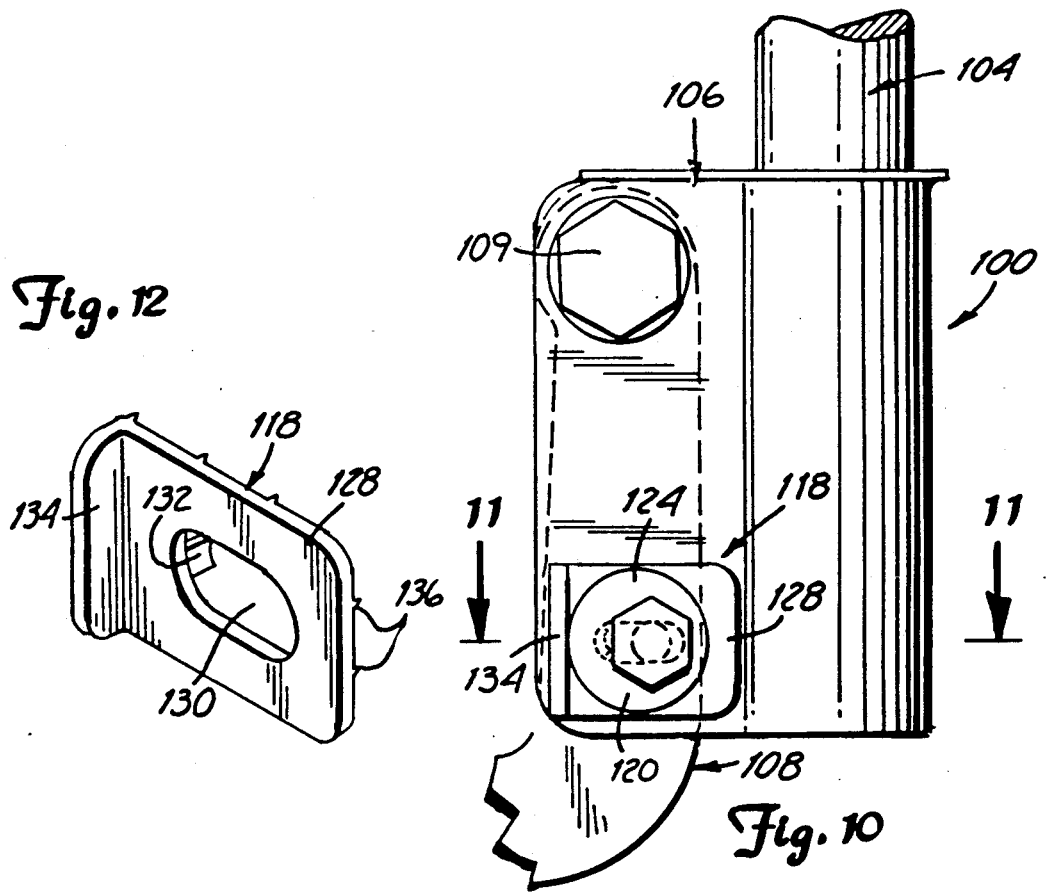

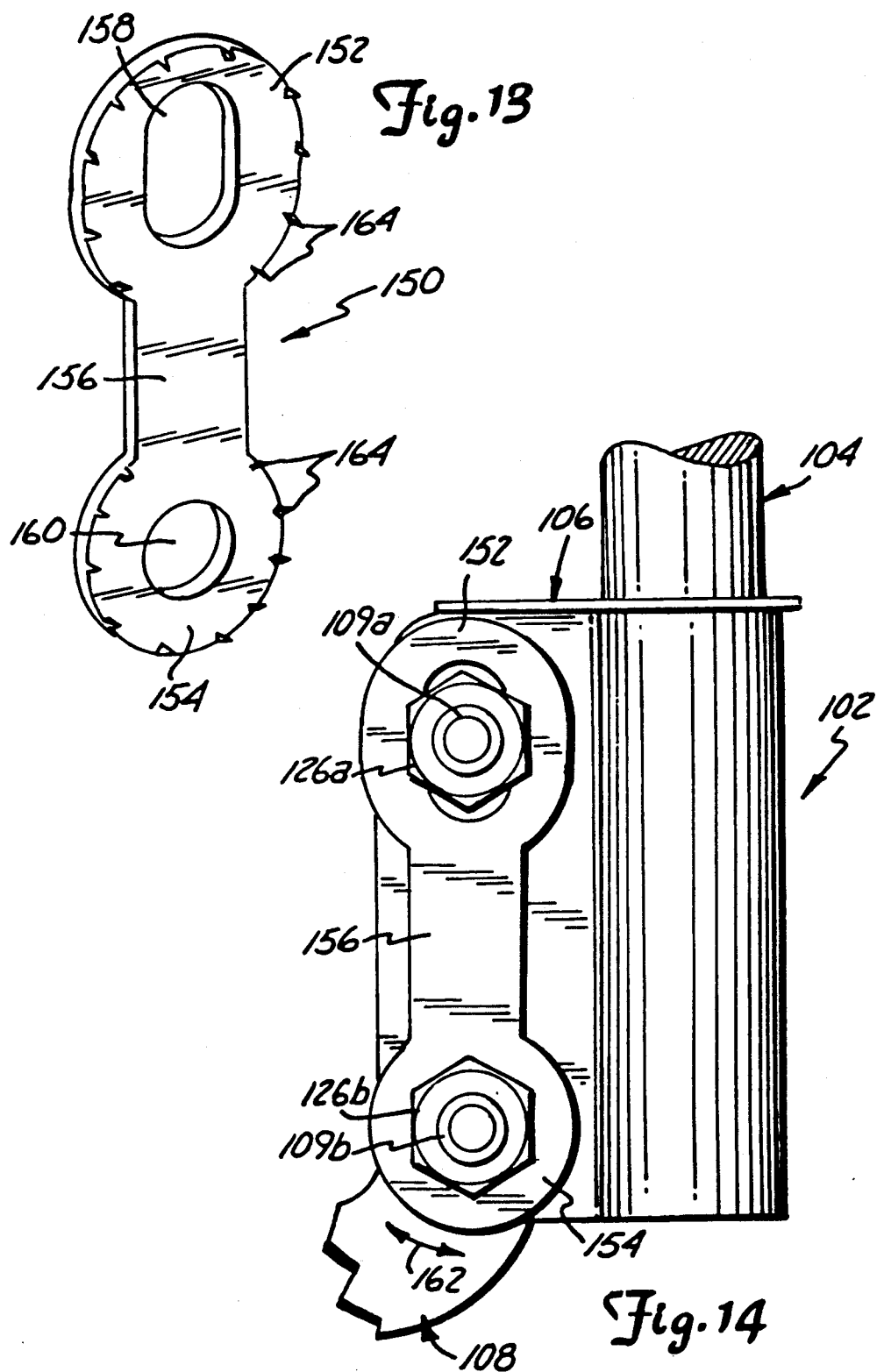

DEVICE FOR ADJUSTMENT OF AUTOMOBILE WHEEL ALIGNMENT

This is a continuation of application Ser. No. 07/342,459, filed Apr. 21, 1989, now U.S. Pat. No. 5,044,659.

BACKGROUND OF THE INVENTION

The present invention relates to a device for adjusting at least one alignment characteristic of a wheel attached to a wheel support of a vehicle. In particular, it relates to wheels that can be adjusted relative to the wheel support member by movement of a bolt.

Various arrangements have been proposed for adjusting alignment characteristics such as toe, camber or caster once the alignment of a wheel has changed. A large percentage of vehicles presently being sold have wheels that are attached to a wheel support member of a vehicle by two bolts positioned in substantially parallel relationship.

One such arrangement to adjust camber is described in the Specktor et al. U.S. Pat. No. 4,618,162 wherein one of the two original bolts is removed, and a bolt of a small diameter is substituted therefor. A wedge-shaped device is inserted between the wheel assembly and a strut member to move the wheel with respect to the strut member.

Another arrangement is disclosed in the Specktor U.S. Pat. No. 4,736,964 that includes a bolt having a cammed washer for substitution of an original bolt in a strut type suspension system. The cammed washer acts against a strut member to which the vehicle wheel is secured thereby moving the wheel to adjust camber.

Another such arrangement is described in the Bridges U.S. Pat. No. 3,880,444 for adjusting camber and caster that includes a bushing having a hexagonal head and an eccentric hole. A bolt extends through the hole to act as a pivot shaft.

SUMMARY OF THE INVENTION

The present invention includes a device for adjusting at least one alignment characteristic in a suspension system that supports the wheel. The system includes a wheel support member to which the wheel is attached by at least one removable bolt. The wheel is moveable when the bolt is removed or a bolt is loosened and slid in a slot in the support member.

The device includes an adjusting bolt which is slid in the slot or whose diameter is smaller than the diameter of the removed bolt. The device further includes a mechanism for engaging the wheel support member and for engaging the bolt such that the bolt is positioned in an offset axial position and a mechanism for moving the wheel assembly relative to the wheel support member. Once the alignment characteristic of the wheel has been completed, the bolt is secured in a non-rotatable position.

BRIEF DESCRIPTION OF THE DRAWINGS

FIG. 3 is a sectional view of the device of the present invention.

FIG. 4 is an elevational view that includes a cross-sectional view of the device of the present invention taken along the line 4—4 in FIG. 3.

FIG. 5 is an elevational view with a cross-section of the device of the present invention taken along the line 5—5 in FIG. 3 illustrating the device in an alignment adjusted position.

FIG. 6 is an exploded perspective view of an alternative embodiment of the device of the present invention.

FIG. 7 is a sectional view of a suspension system illustrating the use of the embodiment of FIG. 6.

FIG. 8 is an elevational view with the embodiment of FIG. 6 shown in cross-section taken along the line 8—8 in FIG. 7.

FIG. 9 is a perspective view of another wheel support system using yet another alternative embodiment of the present invention.

FIG. 10 is an enlarged elevational view of a portion of the suspension system of FIG. 9 showing the device of the present invention in use.

FIG. 11 is a cross-sectional view taken along the line 11—11 in FIG. 10.

FIG. 12 is a perspective view of a cam positioning plate of the present invention.

FIG. 13 is a perspective view of an alternative embodiment of the present invention.

FIG. 14 is an elevational view showing the embodiment of FIG. 13 in use.

DETAILED DESCRIPTION OF THE PREFERRED EMBODIMENTS

Figure 1:
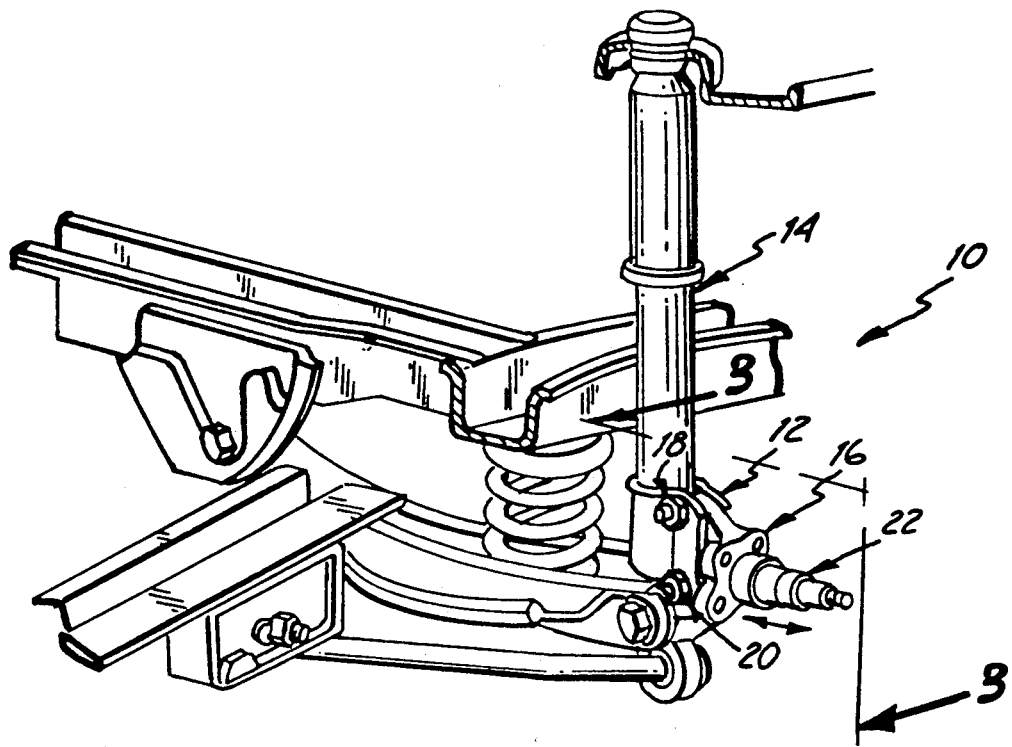
FIG. 1 is a perspective view of a suspension system in which the present invention is used.

A strut type suspension system 10 in which the present invention is particularly useful is illustrated in FIG. 1. The strut type suspension system 10 includes a connecting bracket 12 attached to a strut member 14. A wheel knuckle 16 is attached to the bracket 12 by an upper bolt 18 and a lower bolt 20.

A wheel spindle 22 extends from the wheel knuckle 16. A wheel (not shown) is mounted onto the wheel spindle 22. Although a particular type of suspension system is illustrated in FIG. 1, the present invention is applicable to other types of suspension systems that permit movement of the wheel knuckle after removal of a bolt such as bolt 18 or bolt 20.

Figure 2:
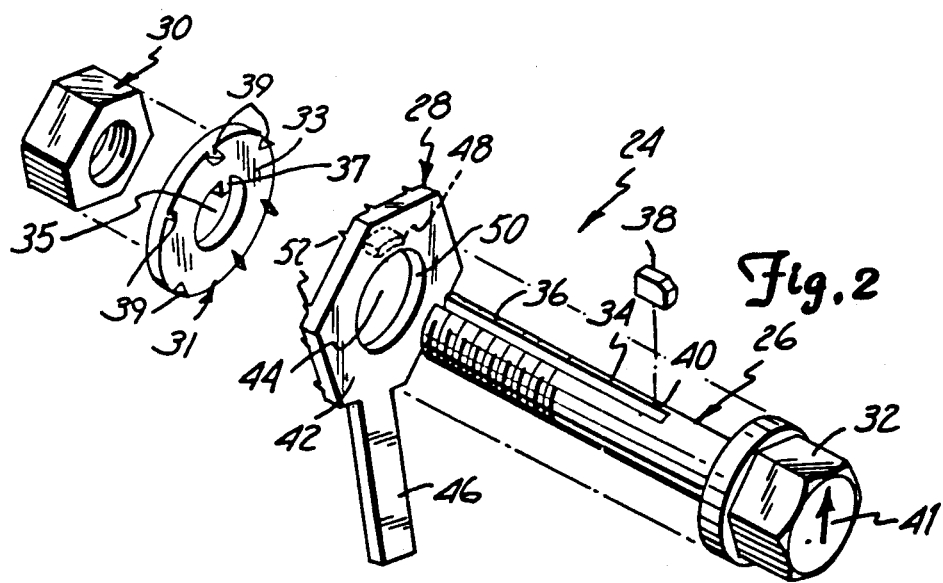
FIG. 2 is an exploded perspective view of the present invention.

A preferred embodiment of the device of the present invention is generally indicated at 24 in FIGS. 2 and 3. The device 24 includes an adjusting bolt 26, an adjusting washer 28, a lock washer 31, and a nut 30. The adjusting bolt 26 includes a head portion 32 and a shaft portion 34 having a threaded end portion 36 and a key way portion 40 extending along the shaft portion 34. A key 38 is press fitted into an aperture 40 in the shaft portion 34 such that the key 38 extends outwardly in a radial direction from the shaft portion 34. The key way is a groove that runs from an end of the threaded end portion 36 to a point along the shaft portion 34 such that the key 38, when press-fitted into the key way, is disposed to move the wheel knuckle 16 as will be described subsequently. Although a key way and key are specifically described, other configurations that include a member extending out from the shaft portion of the bolt are includable within the present invention.

Indicia such as arrow 41 is provided on the head portion of the adjusting bolt 26 to indicate the angular position of the key 38. Although an arrow is specifically used in the embodiment in FIG. 2, any type of indicia which would indicate the angular position of the key is within the scope of the present invention.

The adjusting washer 28 includes a main body portion 42 having an aperture 44 extending therethrough. A handle portion 46 extends outwardly from the main body portion 42 at an obtuse angle to a plane of the main body portion, as best illustrated in FIG. 3. The washer 28 further includes a tab member 48. The tab member 48 extends outwardly from the main body portion in a generally perpendicular direction. The washer further includes a plurality of prongs 53 that extend outwardly from the main body 42 in the same general direction as the tab member 48. The bolt 26 is disposed through the washer 28 prior to press-fitting the key 38 into the key way 40. The prongs 53 are made of case hardened steel so that the prongs can penetrate the bracket 12 as will be discussed subsequently.

The lock washer 31 includes a main body portion 33 having an aperture 35 extending therethrough. A key way engaging tab 37 extends from the main body 33 into the aperture 35. When the washer 31 is positioned over the end of the bolt 26, the key way tab 37 engages the key way preventing rotational movement between the washer 31 and the bolt 26. The washer 31 also includes a plurality of case hardened prongs 39 that can penetrate the bracket 12.

The device 24 is used to adjust the camber of a wheel (not shown) by replacing one of the original bolts 18 or 20. The shaft portion 34 of the adjusting bolt 26 is of a smaller diameter than the shaft portion of either bolt 18 or 20 that is removed. The bolt 20 extends through apertures 52 and 54 of the bracket 12, and aperture 56 of the wheel knuckle 16. As best illustrated in FIG. 3, the adjusting bolt 26 is inserted into the apertures 52, 54, and 56 after the bolt 20 is removed. The washer 28 is positioned such that the prongs 53 face the bracket 12. The tab member 48 is of a length such that the tab member extends into aperture 54 but does not extend into the aperture 56 of the wheel knuckle 16. The lock washer 31 is then placed on the end of the bolt and the nut 30 is threaded on to the end portion 36.

The bolt 26, being of a diameter less than the apertures 52, 54, and 56 and the original bolt 20, is offset from the axis of the apertures 52, 54, and 56 by the tab member 48.

FIG. 4 illustrates a negative camber adjustment using the adjusting bolt 26, as illustrated by arrow 53. The key 38 and the tab member 48 are positioned approximately 180 degrees from each other resulting in the wheel knuckle 16 moving a selected distance, as indicated by arrows 55.

The arrow 41 on the head portion of the bolt 26 indicates the angular position of the key 38. The tab member 48 is disposed 180 degrees from the handle portion 46. Therefore, the handle 46 acts as an indicator as to the position of the tab member 48 since the head of the bolt conceals the position of the tab member.

Once the adjusting bolt 26 is inserted into the apertures 52, 54, and 56 and the lock washer is positioned in place, the nut 30 is tightened to secure the bolt in place but not fully tightened. The washer 28 is held by the handle portion 46, when the nut is fully tightened to insure that the bolt does not turn and so that the key 38 is disposed 180 degrees from the tab 48, as illustrated in FIGS. 4 and 5. In FIG. 4, by positioning the key 38 on a side of the aperture facing the wheel (not shown), movement of the bottom of the wheel (not shown), as illustrated by arrow 53 is obtained to result in a negative camber adjustment as indicated by arrows 55. As illustrated in FIG. 5, positioning of the key 38 on an opposite side of the aperture 56, that is away from the wheel (not shown), movement of the bottom of the wheel (not shown) in the direction of arrow 60 is obtained resulting in a positive camber adjustment as indicated by arrows 59. In both cases, the wheel knuckle 16 is moved by the key 38 acting against the surface of the aperture 56 in cooperation with the positioning of the bolt in an off set position by the tab 48.

It will be appreciated that a full camber is made by turning the bolt to position the key 180 degrees from the tab member's position and that the bolt may be turned to any position between to obtain less than a full adjustment. After the selected amount of adjustment of camber is obtained, the nut 30 is tightened to secure the bolt 26 in place. When the adjusting bolt and nut are tightened, the prongs of both washers 28 and 31 are forced into the bracket 12 so that the angular position of the washer 28 and the bolt 26 are secured.

An alternative embodiment of the present invention is generally indicated at 62 in FIGS. 6 and 7. The embodiment 62 is similar in principal to the embodiment 24 in FIGS. 1 through 5. The same reference characters that were used to describe the suspension system of FIGS. 1 through 5 will be used to describe the suspension system of FIGS. 6 and 7 since both suspension systems are the same.

The device 62 includes an adjusting bolt 64, a first washer 66, and second washer 90, and a nut 68. The bolt 64 includes a head portion 70 and a shaft portion 72. The shaft portion 72 has a threaded end portion 74 and a slot 76. A locking key 78 is positioned in the slot 76 and extends outwardly a selected distance from the shaft portion 72.

The device 62 also includes an adjusting shim 80. The shim 80 has a serrated surface 82 on one side and a shaft engaging surface 84 on another side. The serrated surface 82 includes a plurality of spaced-apart teeth. The shaft engaging surface 84 is contoured to mate with the surface of the shaft portion 72.

The head portion 70 of the bolt includes a bore 86. The bore 86 is positioned such that one end of the bore is adjacent the surface of the shaft portion 72, as best illustrated in FIG. 7. An adjusting pin 88 having a selected diameter (or thickness) extends through the bore 86 and extends out of the bore 86 adjacent the surface of the shaft portion 72 a selected distance.

The first washer 66 includes a main body portion 67 with an aperture 69 extending therethrough. A slot 71 is disposed adjacent the aperture 69 in communication therewith. A plurality of prongs 73 made of case hardened steel are positioned to outwardly extend from the main body 67 in a direction such that the prongs will engage the bracket 12, as will be discussed subsequently.

The second washer 90 also has a main body portion 91 with an aperture 92 extending therethrough. A slot 94 is positioned adjacent the aperture 92 in communication therewith for engaging the key 78. A plurality of prongs 96 extend from one side of the main body portion 91. The prongs are made of case hardened steel and are disposed such that they will engage the bracket 12, as will be discussed subsequently.

The embodiment 62 is quite similar in concept to the embodiment 24 illustrated in FIGS. 1 through 5. The embodiment 62 includes a mechanism to offset the bolt with respect to the apertures 52 and 54 of the connecting bracket 12 and a mechanism for acting against a wheel knuckle 16 to move the wheel knuckle 16 with respect to the connecting bracket 12. However, the embodiment 62 is different in that the bolt 64 need not be turned to make an adjustment in camber.

The original bolt 20 (not shown except in FIG. 1) is removed from the apertures 52, 54, and 56. The bolt 64 has a smaller diameter than the bolt 20 and is inserted into the apertures 52, 54, and 56 with the bore 86 positioned along a line disposed vertically and running through the common axis of the apertures 52, 54, and 56. The shim is then inserted into the aperture 56 through the aperture 52 such that the shim 80 does not extend beyond the aperture 56. The shim 80 is positioned 180 degrees from the bore 86.

Next, the adjusting key 78 is inserted into the slot 76. When the washer 90 is positioned over the end portion of the bolt 64, the slot 94 engages the key 78. After the washer 90 is placed into position, the nut 68 is finger tightened on to the bolt 64.

The pin 88 is then inserted into the bore 86 and into the slot 71 of the washer 66. To facilitate further insertion of the pin, that is into aperture 54, the pin is provided with a pointed end. A hammer or other suitable device is used against the pin to force the pin past the washer 66 into the aperture 54 as illustrated in FIG. 7. The pin 88 does not extend beyond the aperture 54 into the aperture 56.

It will be appreciated that the pin 88 shifts the bolt 64 so that the shim 80 acts against the wheel knuckle 16 thereby moving the wheel knuckle 16 a selected distance as indicated by arrows 90 to adjust camber of the wheel (not shown) in a direction of arrow 92. In addition, once the bolt 64 and nut 68 are tightened, the prongs of the washers 66 and 90 dig into the bracket 12 and since the key 78 and pin 88 engage slots 94 and 71, the angular position of the adjusting bolt is secured.

The embodiment 62 may take other forms which are includable within the scope of the present invention. For example, the shim 80 may be fixedly attached to the shaft portion 74 of the bolt 64 such as by welding so that when the bolt is inserted into the apertures 52, 54, and 56, the shim is inserted along with the bolt. In addition, the shim may take other shapes than the one specifically illustrated in the drawings. Other serrated surfaces may also be used.

An alternative embodiment 100 of the present invention is illustrated in FIGS. 9 through 12. The embodiment 100 is illustrated in use with a suspension system 102. The system 102 includes a strut member 104 connected to an arm 108 by a connecting bracket 106. A pair of bolts 109 (only one original bolt being illustrated in FIG. 9) extend through apertures in the connecting bracket 106 and arm 108 in a manner similar to the embodiments illustrated in FIGS. 1 through 8. The arm 108 in turn is connected to a bearing and wheel support assembly 110 to which the wheel (not shown) is attached.

The embodiment 100 is particularly useful in an arrangement in which the apertures in the connecting bracket are longitudinal slots such as slots 112 and 114, as best illustrated in FIG. 11. The embodiment 100 includes a cam bolt assembly 116 and a cam positioning plate 118.

The cam bolt assembly 116 is essentially the same assembly as described in U.S. Pat. No. 4,736,964, which is assigned to the same Assignee as the present application. The cam bolt assembly includes a bolt 120 and first and second cam washers 122, 124, respectively, and a nut 126 for tightening the bolt assembly. The cam washers each have eccentric openings through which the bolt 120 extends. The bolt 120 is cut-away to provide a flat face and both eccentric openings of the cam washers are configured to generally correspond in cross-sectional configuration to the cross-sectional configuration of the flat faces of the bolt 120 so that the cam washers do not freely rotate with respect to the bolt 120. Although a specific configuration to prevent rotation of the cam washers has been discussed, other arrangements which prevent rotation of the cam washers with respect to the bolt are included within the scope of the present invention.

The cam positioning plate as illustrated in FIG. 12 includes a main body portion 128 having a slotted aperture 130 and a tab member 132. The tab member 132 extends beyond the main body portion in a direction generally perpendicular to a plane of the main body portion 128 for engaging either one of the slotted apertures 112 and 114, as illustrated in FIG. 11. A shoulder portion 134 also extends generally perpendicular from the main body portion 134 in a direction opposite a tab member 132. Preferably, the shoulder portion 134 is disposed at an end of the main body portion. The plate 118 also includes a plurality of prongs 136 extending outwardly from the main body portion in the same general direction as the tab member 132.

After one of the original bolts has been removed, such as previously described with respect to the other embodiments of the previously described figures, the cam positioning plate is positioned along the slotted aperture of the connecting bracket so that the tab member 132 engages the slotted aperture 114. The bolt 120 with cam washer 124 disposed alongside the head portion of the bolt is inserted into the apertures of both plates 118, the connecting bracket 106 and the arm 108. The second cam washer is positioned on a side of the connecting bracket opposite from the first cam washer and the nut 126 is threaded on to the bolt 120 to complete the assembly.

The cam washers 122 and 124 rest against the shoulder portion 134. As the bolt 120 is rotated, the cam washer 124 acts against the shoulder portion 134 and due to the eccentric relationship 124, the bolt 120 is moved along the slots 112 and 114. The movement of the bolt 120 in turn results in the movement of the arm 108 with respect to the connecting bracket 106. Movement of the arm 108 results in an adjustment of camber of the wheel (not shown).

A further embodiment of the present invention is generally illustrated at 150 in FIG. 13. The device 150 includes an upper bolt engaging section 152 and a lower bolt engaging section 154 connected to the upper bolt engaging section 152 by a connecting section 156.

The device 150 is used in the suspension system 102 that is illustrated in FIG. 9 and is shown with the device 150 secured thereto in FIG. 14. The only exception is that both original bolts 109 (being referred to in FIG. 14 as upper bolt 109A and lower bolt 109B) are not removed from the suspension system and are used with device 150.

The lower section 154 includes an aperture 160 and the upper section 152 includes a slotted aperture 158. The slotted aperture 158 is oriented so that its longitudinal axis is substantially parallel with the longitudinal axis of the device 150. As illustrated in FIG. 14, the device 150 is positioned so that the bolt 109B extends through the aperture 160 and the bolt 109A extends through the aperture 158. The device 150 is movable along the slotted aperture which permits movement of the bolt 109B along the slotted hole 112 and 114 in the bracket 106 in the direction of arrow 162.

In use, an upper nut 126A and a lower nut 126B are removed from engagement with the bolts 119A and 119B, respectively.

Once the nuts 126A and 126B are removed and the bolts placed in the respective apertures of the device as discussed previously, the spindle 108 is moved in either outwardly or inwardly as indicated by arrow 162. The spindle is moved using a suitable tool such as a pry bar or the handle portion of the ratchet used to remove the nuts. Once the wheel spindle is moved the selected amount, the nuts 126A and 126B are tightened. The device 150 includes a plurality of case hardened prongs 164 which dig into the surface of the bracket 106 to secure the device 105 in position and prevent the spindle 108 from moving.

Although the present invention has been described with reference to preferred embodiments, workers skilled in the art will recognize that changes may be made in form and detail without departing from the spirit and scope of the invention.

What is claimed is:

1. A device for securing a wheel assembly attached to a wheel support member by at least first and second bolts of a suspension system of an automotive vehicle, the first bolt extending through a first slotted aperture in the wheel support member and the second bolt extending through a second aperture in the wheel support member, the device comprising:
   a first section having a first bolt engaging aperture;
   a second section having a second bolt engaging slotted aperture; and
   a connecting section connecting the first and second sections in a spaced apart relationship; said first, second and connecting sections being movable relative to the wheel support member subsequent to insertion of the first bolt in the first bolt engaging aperture and the first slotted aperture and the second bolt in the second bolt engaging slotted aperture and the second aperture.

2. The device of claim 1 wherein the first, second and connecting sections are part of a single plate having at least one substantially flat side and further including a plurality of prongs extending outwardly from the flat side.

* * * * *